US012562590B2

(12) United States Patent    (10) Patent No.: US 12,562,590 B2
Xu et al.    (45) Date of Patent: Feb. 24, 2026

(54) ENERGY HARVESTING SYSTEM

(71) Applicant: UNIVERSITE CATHOLIQUE DE LOUVAIN, Louvain-la-Neuve (BE)

(72) Inventors: Pengcheng Xu, Louvain-la-Neuve (BE); David Bol, Louvain-la-Neuve (BE); Denis Flandre, Louvain-la-Neuve (BE)

(73) Assignee: UNIVERSITE CATHOLIQUE DE LOUVAIN, Louvain-la-Neuve (BE)

( * ) Notice: Subject to any disclaimer, the term of this patent is extended or adjusted under 35 U.S.C. 154(b) by 0 days.

(21) Appl. No.: 17/927,511

(22) PCT Filed: May 31, 2021

(86) PCT No.: PCT/EP2021/064588

§ 371 (c)(1),
(2) Date: Nov. 23, 2022

(87) PCT Pub. No.: WO2021/245039

PCT Pub. Date: Dec. 9, 2021

(65) Prior Publication Data

US 2023/0208188 A1    Jun. 29, 2023

(30) Foreign Application Priority Data

May 31, 2020   (EP) .................................... 20177636

(51) Int. Cl.
   *H02J 50/00*    (2016.01)
   *H02J 50/20*    (2016.01)
   *H02M 7/217*    (2006.01)

(52) U.S. Cl.
   CPC ............ *H02J 50/001* (2020.01); *H02J 50/20* (2016.02); *H02M 7/217* (2013.01)

(58) Field of Classification Search
   CPC ................................. H02J 50/001; H02J 50/20
   See application file for complete search history.

(56) References Cited

U.S. PATENT DOCUMENTS 9,197,143 B1   11/2015   Townsend et al.
2012/0104867 A1*   5/2012   Mudrick ................. H02J 50/12
                                      307/104

(Continued)

FOREIGN PATENT DOCUMENTS

EP    3211754 A1   8/2017
GB    2558006 A   7/2018

(Continued)

OTHER PUBLICATIONS

Dekimpe Remi et al., "A Battery-Less BLE IoT Motion Detector Supplied by 2.45-GHz Wireless Power Transfer," 2018 28th International Symposium on Power and Timing Modeling, Optimization and Simulation (PATMOS), IEEE, Jul. 2, 2018, pp. 68-75.

(Continued)

*Primary Examiner* — Rexford N Barnie
*Assistant Examiner* — Joseph N Inge
(74) *Attorney, Agent, or Firm* — KARCESKI IP LAW, PLLC

(57) ABSTRACT

In an energy harvesting system, a power extraction circuit extracts electrical power from an environmental power source susceptible of providing a level of power that fluctuates. An electrical power storage device stores the electrical power extracted from the environmental power source by the power extraction circuit. A sensing circuit provides an indication of a level of power that the power extraction circuit can extract from the environmental power source. A controlled switch circuit electrically decouples the power extraction circuit from the electrical power storage device when the indication indicates that the level of power that the power extraction circuit can extract from the environmental power source is insufficient for the power extraction circuit to charge the electrical power storage device. This prevents leakage of harvested power.

14 Claims, 5 Drawing Sheets

(56) References Cited

U.S. PATENT DOCUMENTS

| | | | | |
|---|---|---|---|---|
| 2016/0020636 A1 | | 1/2016 | Khlat | |
| 2017/0250559 A1* | | 8/2017 | Narayanan | H02J 7/34 |
| 2018/0069486 A1* | | 3/2018 | Ouda | H02J 50/80 |
| 2018/0166901 A1* | | 6/2018 | Yu | H02J 7/35 |
| 2019/0334450 A1 | | 10/2019 | Lin et al. | |
| 2020/0076240 A1* | | 3/2020 | Papadopoulos | H04Q 9/00 |
| 2022/0070836 A1* | | 3/2022 | Balasubramanian | H02J 50/20 |

FOREIGN PATENT DOCUMENTS

| | | |
|---|---|---|
| JP | 2014521403 A | 8/2014 |
| JP | 2015012751 A | 1/2015 |
| JP | 2015513884 A | 5/2015 |
| JP | 2015211517 A | 11/2015 |
| JP | 2017153352 A | 8/2017 |
| WO | 2018130847 A1 | 7/2018 |

OTHER PUBLICATIONS

International Search Report and Written Opinion dated Aug. 31, 2021, for International Patent Application No. PCT/EP2021/064588.

Xu Pengcheng et al, "Analysis, Modeling, and Design of a 2.45-GHz RF Energy Harvester for SWIPT IoT Smart Sensors," IEEE Journal of Solid-State Circuits, IEEE, USA, vol. 54, No. 10, Oct. 1, 2019, pp. 2717-2729.

Japanese Decision to Grant dated Jul. 9, 2025, for Japanese Patent Application No. 2022-573557.

Japanese Office Action dated Apr. 1, 2025, for Japanese Patent Application No. 2022-573557.

* cited by examiner

516

700

800

ENERGY HARVESTING SYSTEM

CROSS-REFERENCE TO RELATED APPLICATION(S)

This is a National Stage Entry into the United States Patent and Trademark Office from International Patent Application No. PCT/EP2021/064588, filed on May 31, 2021, based on European Patent Application No. 20177636.6, filed on May 31, 2020, the entire contents of both of which are incorporated herein by reference.

FIELD OF THE INVENTION

An aspect of the invention relates to an energy harvesting system that can extract electrical power from an environmental power source and store that power. The energy harvesting system may be used, for example, in a device that forms part of a so-called Internet of things infrastructure with wireless power transfer. This may enable battery-less operation of such a device. Further aspects of the invention relate to a wireless system that includes a wirelessly powered device comprising an energy harvesting system, and a method of energy harvesting.

BACKGROUND ART

Ambient energy is present substantially everywhere in the form of, for example, electromagnetic radiation, light, heat, wind, vibration and other types of mechanical energy. These are environmental power sources from which an energy harvesting system may extract electrical power. Such an energy harvesting system typically comprises a transducer that converts one or more of the aforementioned types of ambient energy into electrical energy. The electrical energy that has been harvested may then be stored and used to power one or more electrical circuits. In general, the transducer forms part of a power extraction circuit that conditions an electrical power signal provided by the transducer to obtain an electrical power signal suitable for storage and power supply.

Patent publication U.S. Pat. No. 9,197,143 describes a device that includes a plurality of energy harvesting circuits, an energy storage device, a first diode and a second diode. The plurality of energy harvesting circuits includes a first energy harvesting circuit and a second energy harvesting circuit. The first energy harvesting circuit includes a first transducer and the second energy harvesting circuit includes a second transducer. The first transducer is structured for converting a different kind of energy into electricity than is the second transducer. The first diode is electrically connected between the first energy harvesting circuit and the energy storage device and the second diode is electrically connected between the second energy harvesting circuit and the energy storage device. The first diode is oriented to prevent energy from the second energy harvesting circuit from being dissipated in the first energy harvesting circuit and the second diode is oriented to prevent energy from the first energy harvesting circuit from being dissipated in the second energy harvesting circuit.

SUMMARY OF THE INVENTION

There is a need for an improved energy harvesting system that allows relatively high efficiency in power harvesting, in particular when electrical power is to be extracted from an environmental power source susceptible of providing a level of power that fluctuates.

The invention takes the following into consideration. An environmental power source may provide a level of power that fluctuates. For example, in case the environmental power source is in the form of electromagnetic radiation, this radiation may fluctuate in intensity. There may be time intervals during which the electromagnetic radiation is relatively strong and other time intervals during which the electromagnetic radiation is relatively weak. As another example, in case the environmental power source is of a mechanical nature, such as, vibrations, mechanical forces may fluctuate in intensity. There may be time intervals during which vibrations are relatively strong and other time intervals during which vibrations are relatively weak.

In the aforementioned conditions, a power extraction circuit of an energy harvesting system may thus extract a relatively high level of electrical power from the environmental power source during certain time intervals and a relatively low level of electrical power during other time intervals. Accordingly, an electrical power storage device in the energy harvesting system will receive a fluctuating level of electrical power from the power extraction circuit. It may thus happen that the power extraction circuit provides a level of electrical power that is insufficient for charging the electrical power storage device. In such a condition, stored electrical power may leak out of the electrical power storage device through the power extraction circuit. That is, instead of electrical power flowing from the power extraction circuit into the electrical power storage device, electrical power flows from the electrical power storage device into the power extraction circuit, which is a leakage that constitutes a loss of stored electrical power.

In accordance with an aspect of the invention as defined in claim 1, there is provided an energy harvesting system comprising:

a power extraction circuit adapted to extract electrical power from an environmental power source susceptible of providing a level of power that fluctuates; and an electrical power storage device adapted to store the electrical power extracted from the environmental power source by the power extraction circuit, wherein the power extraction circuit comprises:

a sensing circuit adapted to provide an indication of a level of power that the power extraction circuit can extract from the environmental power source; and a controlled switch circuit adapted to electrically decouple the power extraction circuit from the electrical power storage device when the indication indicates that the level of power that the power extraction circuit can extract from the environmental power source is insufficient for the power extraction circuit to charge the electrical power storage device. This implies that the controlled switch circuit may electrically couple the power extraction circuit to the electrical power storage device when the indication indicates that the level of power that the power extraction circuit can extract from the environmental power source is sufficient for the power extraction circuit to charge the electrical power storage device.

Thus, in the energy harvesting system in accordance with the invention, the power extraction circuit is electrically decoupled from the electrical power storage device in case the latter cannot be charged because the level of electrical power that can be extracted from the environmental power source is too low. Electrically decoupling the power extraction circuit from the electrical power storage device means that these two entities are electrically isolated from each other. Accordingly, this prevents that stored electrical power leaks away from the electrical power storage device through the power extraction circuit, which leakage may otherwise occur as explained hereinbefore. Since leakage and thus loss of harvested energy is prevented, higher efficiency in energy harvesting can be achieved.

In accordance with a further aspect of the invention as defined in claim 14, there is provided a wireless system comprising:

a power emitting device adapted to wirelessly emit a power signal having a high peak to average power ratio;

a wirelessly powered device comprising an energy harvesting system as defined hereinbefore, wherein power extraction circuit comprises an antenna adapted to extract electrical power from environmental radio frequency power.

For the purpose of illustration, some embodiments of the invention are described in detail with reference to accompanying drawings. In this description, additional features will be presented, some of which are defined in the dependent claims, and advantages will be apparent.

DESCRIPTION OF SOME EMBODIMENTS

Figure 1:
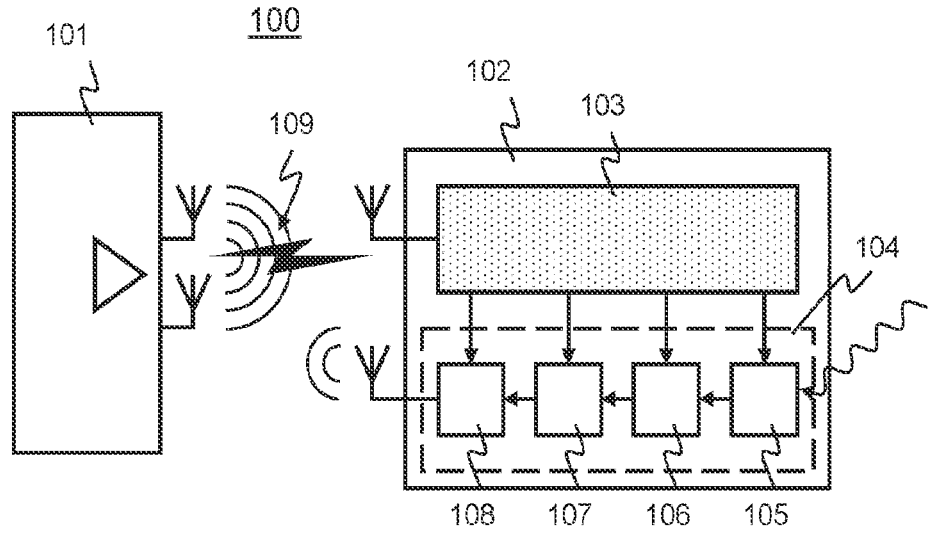
FIG. 1 is a block diagram of a wireless system that includes a wirelessly powered device.

FIG. 1 schematically illustrates a wireless system 100. FIG. 1 provides a block diagram of the wireless system 100. The wireless system 100 comprises a power emitting device 101 and a wirelessly powered device 102. The wireless system 100 may constitute, for example, a so-called Internet of things infrastructure with wireless power transfer. The wireless system 100 may thus comprise one or more further wirelessly powered devices, which are not represented in FIG. 1 for the sake of simplicity and convenience. For the sake of illustration, the wirelessly powered device 102 illustrated in FIG. 1 constitutes a smart low-power sensor, although such a device may have a different function in another embodiment.

In more detail, the smart low-power sensor 102 comprises an energy harvesting system 103 and a sensing system 104. The sensing system 104 may comprise a sensor device 105, a sensor interface 106, a processing and control circuit 107, and a transmission circuit 108. The transmission circuit 108 may be, for example, of the Bluetooth low energy type.

The wireless system 100 may basically operate as follows. The power emitting device 101 emits a radio-frequency power signal 109 towards the smart low-power sensor 102. To that end, the power emitting device 101 may comprise an antenna array and a beamforming circuit. The radio-frequency power signal 109 may lie in a license-free frequency band for industrial, scientific and medical purposes, such as, for example, a 2.45 GHz band. The radio-frequency power signal 109 may convey information to the smart low-power sensor 102 in addition to power.

The radio-frequency power signal 109 is an environmental power source for the smart low-power sensor 102; environmental radio-frequency power is available at the smart low-power sensor 102. The energy harvesting system 103 in the smart low-power sensor 102 extracts electrical power from this environmental radio-frequency power and stores this extracted electrical power. The energy harvesting system 103 may generate a power supply voltage on the basis of this extracted and stored electrical power. The sensing system 104 receives this power supply voltage and may entirely operate on the basis thereof. The smart low-power sensor 102 may thus have a battery-less operation thanks to the environmental radio-frequency power and the energy harvesting system 103.

Figure 2:
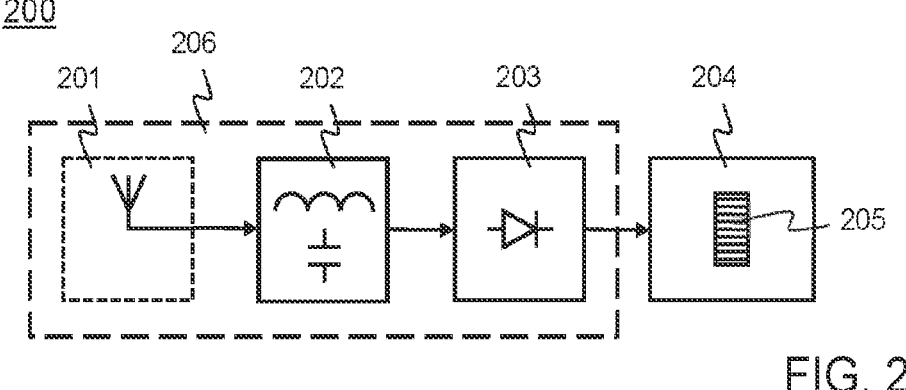
FIG. 2 is a block diagram of a basic implementation of an energy harvesting system in the wirelessly powered device.

FIG. 2 schematically illustrates a basic implementation 200 of the energy harvesting system 103 in the smart low-power sensor 102. FIG. 2 provides a block diagram of this basic implementation 200, which will be referred to hereinafter as basic energy harvesting system 200 for the sake of convenience. The basic energy harvesting system 200 comprises an antenna 201, an impedance matching circuit 202, a rectifier circuit 203, and a power management circuit 204, which includes an electrical power storage device 205. The antenna 201, the impedance matching circuit 202, and the rectifier circuit 203 jointly constitute a power extraction circuit 206. The power management circuit 204 may be based on, for example, an integrated power management circuit type number AEM30940 proposed by e-peas semiconductors.

The basic energy harvesting system 200 basically operates as follows. The antenna 201 absorbs a portion of the environmental radio-frequency power. The impedance matching circuit 202 aims at making as large as possible the portion of the environmental radio-frequency power that is absorbed. The impedance matching circuit 202 further aims at transferring as much as possible of the portion of the environmental radio-frequency power that is absorbed to the rectifier circuit 203. The rectifier circuit 203 receives a reduced portion of the environmental radio-frequency power and converts this into direct current power. The power management circuit 204 receives and stores this direct current power. The power management circuit 204 further generates the supply voltage mentioned hereinbefore on the basis of the received and stored direct current power.

The basic energy harvesting system 200 has a power harvesting efficiency that is relatively low if the environmental radio-frequency power is relatively low. It has been observed that the power harvesting efficiency may degrade significantly if the environmental radio-frequency power is below −10 dBm, dBm being a unit of level used to indicate a power ratio expressed in decibels (dB) with reference to one milliwatt (mW). This power harvesting efficiency problem is mainly due to the following.

The lower the environmental radio-frequency power is, the smaller an input radio-frequency signal voltage at the rectifier circuit 203 is, and, as a consequence, the larger an equivalent input resistance of the rectifier circuit 203 is. For example, it has been observed that the equivalent input resistance may increase exponentially from 0.1 kΩ to 1 MΩ when the environmental radio-frequency power drops from +5 dBm to −20 dBm.

The higher the equivalent input resistance of the rectifier circuit 203 is, the larger impedance differences are that the impedance matching circuit 202 has to match. In case the equivalent input resistance of the rectifier circuit 203 is relatively high, the impedance matching circuit 202 may not provide sufficient matching, or may induce relatively significant losses, or both. This makes that only a relatively small portion of the environmental radio-frequency power reaches the rectifier circuit 203 and, consequently, that the direct current power that is extracted is relatively low. This problem related to impedance matching is exacerbated at relatively high frequencies, such as, for example, 2.45 GHz due to parasitic impedances that may be present on, for example, a printed circuit board and a device package.

A constraint to be taken into consideration in connection with the power harvesting efficiency problem concerns regulations on maximum radiated power. These regulations are commonly referred to as EIRP regulations, whereby EIRP is an acronym for equivalent or effective isotropic radiated power. The power emitting device 101 in the wireless system 100 illustrated in FIG. 1 should comply with the applicable regulation EIRP, which means that the radio-frequency power signal 109 should not exceed the maximum radiated power defined by this regulation. Thus, in case that the power emitting device 101 radiates the maximum radiated power, there is a maximum distance from this device at which the smart low-power sensor 102 can still operate. The higher the power harvesting efficiency of the energy harvesting system 103 is, the greater the maximum distance is, A possible solution to the power harvesting efficiency problem given the constraint set by EIRP regulations consists in that the radio-frequency power signal 109 has a high peak to average power ratio. That is, the radio-frequency power signal 109 may be given a non-constant envelope waveform that comprises relatively short high-power bursts interleaved with relatively long periods where emitted power is relatively low. Such a waveform may be synthesized by combining multiple tones, such as, for example 64 BPSK-modulated tones, whereby BPSK is an acronym for binary phase shift keying. More specifically, the waveform may be generated from an inverse 64-points fast Fourier transform (IFFT) on a 64 size Walsh-Hadamard code.

Figure 3:
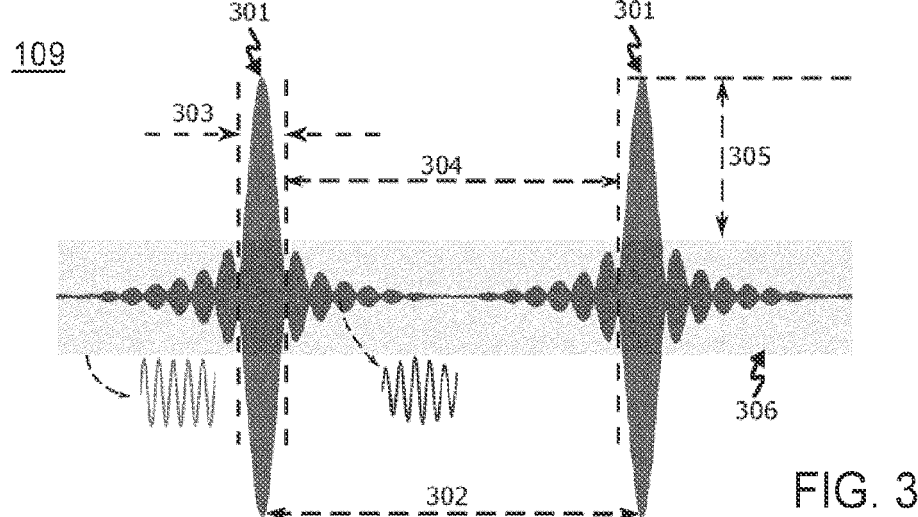
FIG. 3 is a waveform diagram of a radio-frequency power signal that may be emitted in the wireless system.

FIG. 3 schematically illustrates an example of the radio-frequency power signal 109 that may be emitted by the power emitting device 101 in the wireless system 100 illustrated in FIG. 1. FIG. 3 provides a waveform diagram of the radio-frequency power signal 109. The radio-frequency power signal 109 comprises relatively short power bursts 301 that may periodically occur, for example, every 21 µs. That is, the relatively short power bursts 301 may have a period 302 of 21 µs. The power bursts 301 may have a duration 303 of 0.65 µs. Time intervals between two consecutive power bursts 301, where emitted power is relatively low, may have a duration 304 of 20.35 µs. The radio-frequency power signal 109 may have a peak to average power ratio 305 of 18.24 dB.

The energy harvesting system 103 may have a higher power harvesting efficiency when the radio-frequency power signal 109 has a relatively high peak to average power ratio 305, as illustrated in FIG. 3, compared with an implementation where the radio-frequency power signal 109 has a constant envelope 306, implying a peak to average power ratio of 0 dB. Namely, the equivalent input resistance of the rectifier circuit 203 will be relatively low during the power bursts 301 in the radio-frequency power signal 109 illustrated in FIG. 3. This allows the impedance matching circuit 202 to provide satisfactory impedance matching, or reduce its power loss, or both, as explained hereinbefore, which contributes to power harvesting efficiency.

However, in case the radio-frequency power signal 109 has a relatively high peak to average power ratio 305 as illustrated in FIG. 3, a phenomenon may occur that is detrimental to the power harvesting efficiency of the basic energy harvesting system 200 illustrated in FIG. 2. During the time intervals 304 where emitted power is relatively low, the input radio-frequency signal voltage at the rectifier circuit 203 is relatively small, whereas a relatively large direct current voltage may be present at an output node of the rectifier circuit 203. In this situation, a leakage current may occur that goes from the output node of the rectifier circuit 203 to signal ground. This leakage current draws from the direct current power that has been extracted from the power bursts 301. The leakage current may be relatively significant, in particular when the peak to average power ratio 305 of the radio-frequency power signal 109 is relatively high. Thus, while the relatively high peak to average power ratio 305 may contribute to the power harvesting efficiency, this may also induce the current leakage problem, which is detrimental to the power harvesting efficiency.

A solution to the current leakage problem may comprise inserting a diode between the rectifier circuit 203 and the power storage device 205 for preventing a leakage current from flowing from the power storage device 205 to signal ground. However, such a diode has a relatively large forward on-resistance that causes power loss, which is also detrimental to the power harvesting efficiency, although may be to a lesser extent than the leakage current. The power loss may be mitigated by decreasing the on-resistance, which, in practice, means increasing a size of the diode, or opting for a specific discrete diode, which is detrimental to cost and compactness. Increasing the size of the diode for decreasing its forward on-resistance can induces a relatively large reverse leakage current, which is also detrimental to the power harvesting efficiency.

Figure 4:
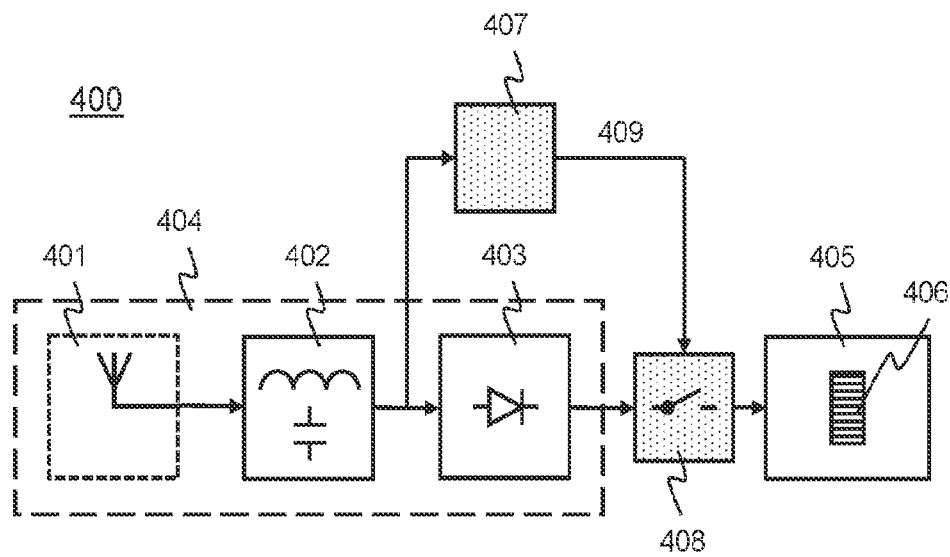
FIG. 4 is a block diagram of an improved implementation of the energy harvesting system.

FIG. 4 schematically illustrates an improved implementation 400 of the energy harvesting system 103. FIG. 4 provides a block diagram of the improved implementation 400 of the energy harvesting system 103, which will be referred to hereinafter as the improved energy harvesting system 400 for the sake of convenience. The improved energy harvesting system 400 comprises various entities that are also present in the basic energy harvesting system 200 illustrated in FIG. 2: an antenna 401, an impedance matching circuit 402, a rectifier circuit 403, which jointly constitute a power extraction circuit 404. The improved harvesting system also comprises a power management circuit 405, which includes an electrical power storage device 406. The power management circuit 405 may be based on, for example, an integrated energy management circuit type number AEM30940 proposed by e-peas semiconductors. The electrical power storage device 406 may comprise, for example, a capacitor.

In addition, the improved energy harvesting system 400 comprises a sensing circuit 407 and a controlled switch circuit 408. In this embodiment, the sensing circuit 407 is coupled to receive an input radio-frequency signal voltage that is present at the rectifier circuit 403. The controlled switch circuit 408 may be coupled between an output node of the rectifier circuit 403 and the electrical power storage device 406, which is included in the power management circuit 405.

The improved energy harvesting system 400 basically operates as follows. The sensing circuit 407 provides an indication 409 of a level of power that the power extraction circuit 404 can presently extract from the environmental power source. The controlled switch circuit 408 electrically decouples the power extraction circuit 404 from the electrical power storage device 406 when the indication 409 indicates that the level of power that the power extraction circuit 404 can extract from the environmental power source is insufficient for the power extraction circuit 404 to charge the electrical power storage device 406. Referring to FIG. 3, the latter condition occurs in the time intervals 304 between two consecutive power bursts 301 where the emitted radio-frequency power is relatively low. Since the electrical power storage device 406 is decoupled from the rectifier circuit 403 in these time intervals, the aforementioned leakage current is significantly reduced.

Moreover, the controlled switch circuit 408 may have an on-resistance that is lower than a typical on-resistance of a diode, which is another solution to prevent leakage current as explained hereinbefore. Since the on-resistance of the controlled switch circuit 408 can be relatively low, there will be less forward power loss during a closed switch mode when the indication 409 indicates that the level of power that the power extraction circuit 404 can extract from the environmental power source is sufficient for the power extraction circuit 404 to charge the electrical power storage device 406. Moreover, the controlled switch circuit 408 may have an off-resistance that is higher than a typical off-resistance of a diode. Since the off-resistance of the controlled switch circuit 408 can be relatively high, there will be less reverse leakage loss during an open switch mode when the indication 409 indicates that the level of power that the power extraction circuit 404 can extract from the environmental power source is insufficient for the power extraction circuit 404 to charge the electrical power storage device 406. These make that the improved energy harvesting system 400 may have a relatively high power harvesting efficiency compared with the basic energy harvesting system 200, as well as compared with the latter system to which a leakage-preventing diode has been added.

Figure 5:
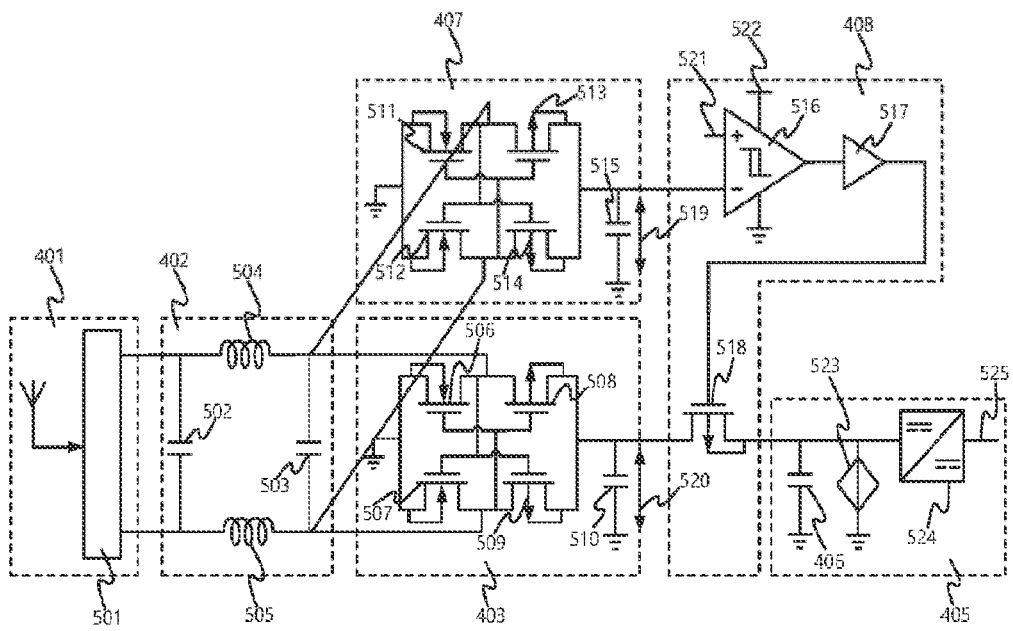
FIG. 5 is a mixed block and circuit diagram of the improved implementation of the energy harvesting system.

FIG. 5 schematically illustrates an embodiment of the improved energy harvesting system 400 presented hereinbefore with reference to FIG. 4. FIG. 5 provides a mixed block and circuit diagram of this embodiment, which will also be referred to as the improved energy harvesting system 400 for the sake of convenience. The improved energy harvesting system 400 may be designed for environmental radio-frequency power at 2.45 GHz produced by, for example, the emitted radio-frequency power signal 109 illustrated in FIG. 3, which is generated in the power emitting device 101 illustrated in FIG. 1.

In this embodiment, the antenna 401 comprises a so-called balun circuit 501 for converting a single-ended antenna signal into a differential antenna signal. However, in another embodiment, the antenna 401 may be a differential antenna without a balun circuit. The impedance matching circuit 402 comprises an input capacitor 502, an output capacitor 503, and a pair of inductors 504, 505 coupled between the aforementioned capacitors, as illustrated in FIG. 5. The input capacitor 502 may have a capacitance of, for example, 2 pF (picofarad). The output capacitor 503 may have a capacitance of, for example, 0.45 pF. Parasitic capacitances of a package and bonding wires may form the output capacitor 503. The pair of inductors 504, 505 may have an overall inductance of 7 nH (nanohenry), each inductor having an inductance of 3.5 nH.

In this embodiment, the rectifier circuit 403 is a so-called cross coupled rectifier circuit 403, which has a dynamic threshold voltage compensation ability. The rectifier circuit 403 in this embodiment will therefore be referred hereinafter as cross coupled rectifier circuit 403. The cross coupled rectifier circuit 403 has a relatively low equivalent output resistance, which may potentially make that the leakage current mentioned hereinbefore is relatively large. However, the leakage current problem is prevented in the improved energy harvesting system 400 by a smart gating solution provided by the sensing circuit 407 and the controlled switch circuit 408 as described hereinbefore.

The cross coupled rectifier circuit 403 comprises two NMOS transistors 506, 507 and two PMOS transistors 508, 509, which are coupled to operate as diodes. The NMOS transistors 506, 507 may have a gate width of, for example, 24 μm and the gate length of 60 nm. The PMOS transistors 508, 509 may have a gate width of, for example, 48 μm and the gate length of 60 nm. The cross coupled rectifier circuit 403 further comprises a ripple filtering capacitor 510 at an output node.

In this embodiment, the sensing circuit 407 is in the form of a scaled-down replica 407 of the rectifier circuit. The sensing circuit 407 in this embodiment will therefore be referred hereinafter as scaled-down replica 407 of the rectifier circuit. The smaller the scaled-down replica 407 of the rectifier circuit is, the less power this circuit 407 will consume, which is generally desirable. That is, a large downscaling factor may be desirable, such as, for example, a downscaling of two orders of magnitude. A maximum achievable downscaling factor may be determined by to fabrication process characteristics, which sets a minimum transistor width.

The scaled-down replica 407 of the rectifier circuit thus also comprises two NMOS transistors 511, 512 and two PMOS transistors 513, 514, which are also coupled to operate as diodes. The two NMOS transistors 511, 512 and two PMOS transistors 513, 514 the scaled-down replica are significantly smaller than the two NMOS transistors 506, 507 and the two PMOS transistors 508, 509 in the cross coupled rectifier circuit 403. The NMOS transistors 511, 512 in the scaled-down replica may have a gate width of, for example, 0.4 μm and the gate length of 60 nm. This corresponds with a size ratio of approximately 1:60 with respect to the NMOS transistors 506, 507 in the cross coupled rectifier circuit 403. The PMOS transistors 513, 514 may have a gate width of, for example, 0.8 μm and the gate length of 60 nm. This corresponds also with a size ratio of approximately 1:60 with respect to the PMOS transistors 508, 509 in the cross coupled rectifier circuit 403. Accordingly, a downscaling factor of approximately 60 applies in this example.

The scaled-down replica 407 of the rectifier circuit also comprises a ripple filtering capacitor 515 at an output node, which is a scaled-down replica of the ripple filtering capacitor 510 in the cross coupled rectifier circuit 403. The same scaling factor may apply to this scaled-down ripple filtering capacitor 515. Thus, the scaled-down ripple filtering capacitor 515 may have a capacitance that is approximately 60 times smaller than the capacitance of the ripple filtering capacitor 510 at the output node of the cross coupled rectifier circuit 403.

In this embodiment, the controlled switch circuit 408 comprises a comparator circuit 516, a buffer 517 and a PMOS transistor 518 that operates as a switch between the cross coupled rectifier circuit 403 and the electrical power storage device 406 in the power management circuit 405. In this embodiment, the electrical power storage device 406 is in the form of a capacitor. The PMOS transistor 518 that operates as a switch will be referred to hereinafter as PMOS switch 518 for the sake of convenience. The PMOS switch 518 may have a size is that is two times larger than that of the PMOS transistors 508, 509 in the cross coupled rectifier circuit 403. This contributes to the PMOS switch 518 having a relatively low forward on-resistance and thus contributes to the power harvesting efficiency. The PMOS switch 518 further provides an advantage when the improved energy harvesting system 400 has to start up. Namely, at start-up, the PMOS switch is by default in a closed state since its gate voltage is at a low level, for example, 0 V.

In this embodiment, the power management circuit 405 further comprises a maximum power point tracking circuit 523 and a DC/DC converter circuit 524, whereby DC is an acronym for direct current. The maximum power point tracking circuit 523 regulates the voltage on the power storage device 406 for improving power extracting efficiency. The DC/DC converter circuit generates a stable DC power supply voltage 525 for the sensing system 104 illustrated in FIG. 1 regardless of voltage variations on the power storage device 406. The maximum power point tracking circuit 523 and DC/DC converter circuit 524 may be based on, for example, an integrated power management circuit type number AEM30940 proposed by e-peas semiconductors.

The improved energy harvesting system 400 illustrated in FIG. 5 basically operates as follows. The scaled-down replica 407 of the rectifier circuit provides an output voltage 519 that represents an output voltage 520 of the cross coupled rectifier circuit 403 when the PMOS switch 518 is in an open state. That is, the output voltage 519 of the scaled-down replica 407 of the rectifier circuit represents the output voltage 520 of the cross coupled rectifier circuit 403 in case no load is coupled to the output node of this circuit. The output voltage of the scaled-down replica 407 of the rectifier circuit will be referred to as sensing voltage 519 hereinafter. In this embodiment, the sensing voltage 519 may thus constitute the indication 409 mentioned hereinbefore with respect to the improved energy harvesting system 400 illustrated in FIG. 4.

In case the sensing voltage 519 is higher than a voltage that is present on the electrical power storage device 406 in the power management circuit 405, the power extraction circuit 404 may be capable of charging the electrical power storage device 406. This is typically the case during a power burst 301 in the radio-frequency power signal 109 illustrated in FIG. 3. In that case, the PMOS switch 518 may be set in a closed state providing a low resistance path between the cross coupled rectifier circuit 403 and the power management circuit 405.

Conversely, in case the sensing voltage 519 is lower than the voltage that is present on the electrical power storage device 406, the power extraction circuit 404 may not be capable of charging the electrical power storage device 406. This is typically the case in the time intervals 304 between the power bursts 301 in the radio-frequency power signal 109 illustrated in FIG. 3. In that case, the current leakage problem described hereinbefore may occur: a relatively significant leakage current may flow from the electrical power storage device 406 to signal ground, which constitutes a loss of harvested energy. In that case, the PMOS switch 518 may be set in the open state to prevent this loss, or at least mitigate this loss.

The comparator circuit 516 compares the sensing voltage 519 with the voltage applied on the non-inverting input 521 that is present on the electrical power storage device 406. In case the sensing voltage 519 is higher, the comparator circuit 516 causes the buffer 517 to apply a relatively low voltage, which is near to signal ground, to a gate of the PMOS switch 518. This set the PMOS in the closed state, allowing the power extraction circuit 404 to charge the electrical power storage device 406. Conversely, in case the sensing voltage 519 is lower than the voltage that is present on the electrical power storage device 406, the comparator circuit 516 causes the buffer 517 to apply a relatively high voltage, which is near to supply voltage level 522, to the gate of the PMOS switch 518. This sets the PMOS in the open state, this countering the current leakage problem. The power supply voltage 522 for the comparator circuit 516 may be the voltage on the electrical power storage device 406, or the output voltage 525 generated by the power management circuit 405.

In practice, the comparator circuit 516 will exhibit rising edge and falling edge delays and voltage signal propagation delay, which correspond with delays for switching the PMOS switch 518 from the closed state to the open state, and vice versa. These delays may affect power harvesting efficiency. A leakage current may occur during a delay for switching the PMOS switch 518 from the closed state to the open state. Power that could be harvested is missed during a delay for switching the PMOS switch 518 from the open state into the closed state.

Figure 6A:
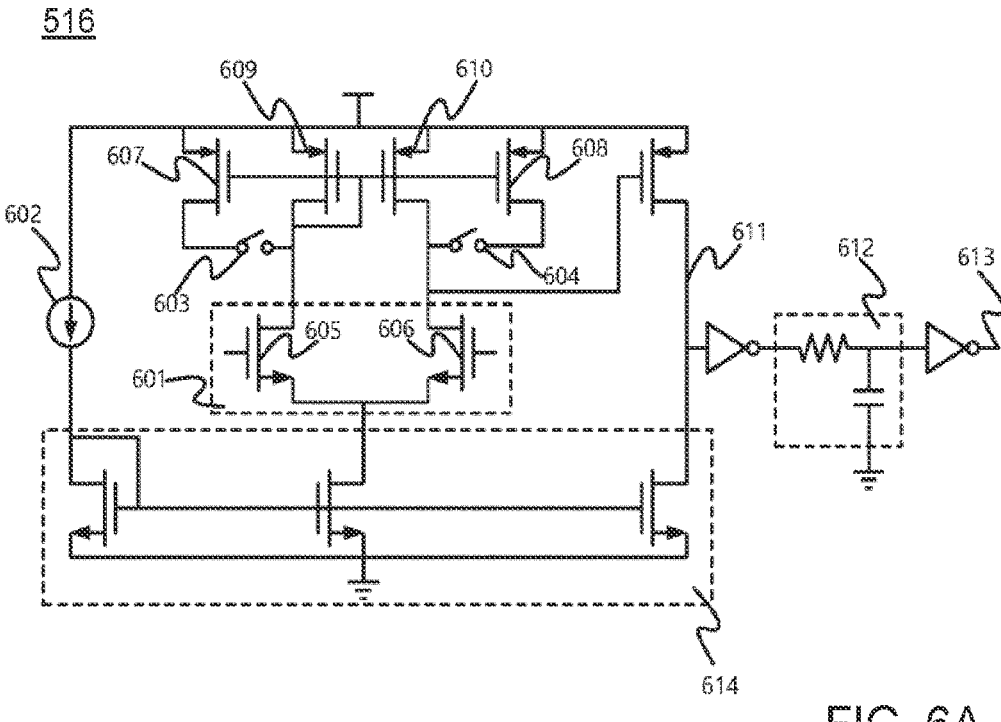
FIG. 6A is a circuit diagram of a comparator circuit in the improved implementation of the energy harvesting system.

FIG. 6A schematically illustrates an embodiment of the comparator circuit 516 in the improved energy harvesting system 400 illustrated in FIG. 5. FIG. 6A provides a circuit diagram of this embodiment, which will be referred to hereinafter as the comparator circuit 516 for the sake of convenience. The comparator circuit 516 comprises a differential transistor pair 601, which provides an inverting input and a non-inverting input. In order that the aforementioned delays for switching the PMOS switch 518 are relatively low, the differential transistor pair 601 may comprise low threshold voltage MOS transistors that are relatively narrow having a length of, for example, 0.2 μm.

The delays concerned may generally be reduced by increasing a biasing current of the differential transistor pair. However, this comes at an expense of more power consumed by the comparator circuit 516, which is detrimental to power harvesting efficiency. Thus, a compromise is to be made with respect to the biasing current. A satisfactory compromise may be achieved with the biasing current being several tens of nanoampere (nA), such as, for example, 30 nA. A bias current 602 may be generated from a beta-multiplier reference circuit or a band-gap reference circuit. The bias current 602 is mirrored to different circuit branches by a current mirror circuit 614.

In more detail, the comparator circuit 516 comprises a switch 603, a switch 604, a transistor 605 and a transistor 606, that constitute the differential transistor pair 601, a transistor 607 and a transistor 608, which are coupled to a current mirror formed by a transistor 609 and a transistor 610, a circuit line 611, a delay circuit 612, which is followed by a buffer providing a voltage signal 613. The switch 603 may be in the form of, for example, a PMOS transistor. The switch 604 may be in the form of, for example, an NMOS transistor. The voltage signal 613 may be applied to the gate of PMOS transistor 603 and to the gate of NMOS transistor 604. The delay circuit 612 may comprise, for example, a resistor and a capacitor.

Figure 6B:
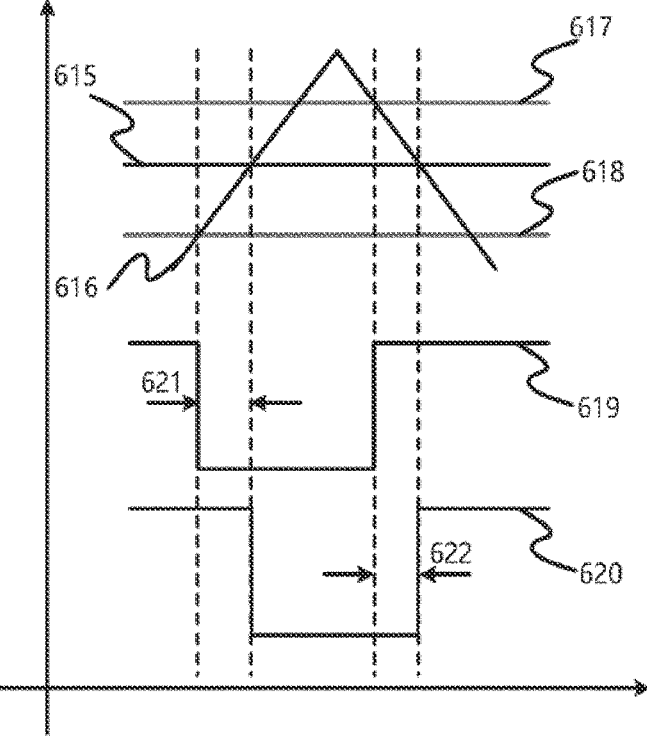
FIG. 6B is a time diagram of various signals in the comparator circuit.

FIG. 6B schematically illustrates signals in the comparator circuit 516, which are schematically represented in a time diagram. The time diagram has a horizontal axis that represents time T, and a vertical axis that represents signal level L. The time diagram is divided into respective horizontal sections representing respective signals.

The comparator circuit 516 illustrated in FIG. 6A basically operates as follows, whereby reference is made to the signals therein illustrated in FIG. 6B. When the voltage signal 613 is at a high level during the time intervals 304 between the power bursts 301 in the radio-frequency power signal 109 illustrated in FIG. 3, the switch 604 shorts the transistor 608 to the transistor 610 and the switch 603 decouples the transistor 607 from the transistor 609. As a result, the comparator circuit 516 has a lower threshold voltage 618 than a voltage signal 615 on the gate of the transistor 606, which may be the voltage on the power storage device 406. A voltage signal 619 at the circuit line 611 of the comparator circuit 516, which is the input voltage of a buffer, goes from a high level to a low level, when a voltage signal 616 at the gate of transistor 605, which is the voltage 519 illustrated in FIG. 5, rises across the threshold voltage 618. After a time delay 621 introduced by a limited transient response of the comparator 516 and the buffer, the PMOS switch 518 closes when its gate voltage signal 620 goes from the high level to the low level.

After a time delay introduced by the delay circuit 612, the voltage signal 613 goes from a high level to a low level. The delay circuit 612 ensures stability in comparator threshold voltage changes. When the voltage signal 613 is at the low level, the switch 604 decouples the transistor 608 from the transistor 610 and the switch 603 shorts the transistor 607 to the transistor 609. The comparator has a higher threshold voltage 617 than the voltage signal 615 on the gate of transistor 606, which may be the voltage on the power storage device 406. The voltage signal 619 at the circuit line 611 of this comparator circuit 516 goes from the low level to the high level, when voltage signal 616 at the gate of transistor 605 which is the voltage 519 illustrated in FIG. 5, drops across the threshold voltage 617. After a time delay 622 introduced by the limited transient response of the comparator 516 and the buffer, the gate voltage signal 620 goes from the low level to the high level and opens the PMOS switch 518.

The comparator circuit 516 thus exhibits a delayed hysteresis that allows aligning a duration of the voltage signal 620 being at the low level with a duration of the voltage 616 being above the voltage 615. The comparator circuit 516 can thus compensate the delays described hereinbefore, or at least mitigate these delays. Accordingly, an adequate timing in control of the PMOS switch can be achieved, which matches power bursts 301 in the radio-frequency power signal 109 illustrated in FIG. 3.

Figure 7:
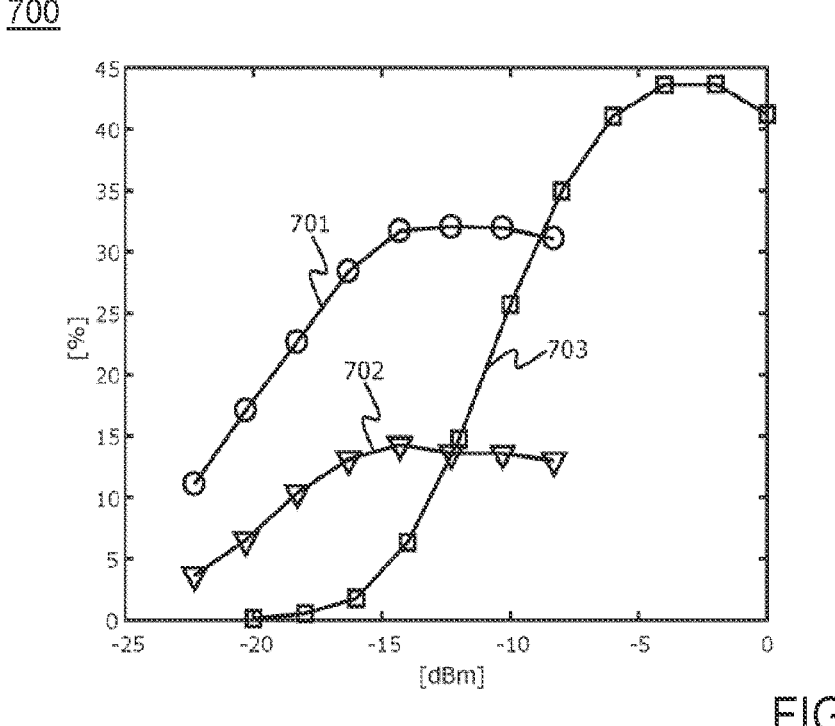
FIG. 7 is a graph in which power harvesting efficiency is plotted as a function of incident radio-frequency power for different power harvesting systems.

FIG. 7 illustrates a relationship between power harvesting efficiency and incident radio-frequency power for different power harvesting systems. FIG. 7 provides a graph 700 having a horizontal axis that represents average incident radio-frequency power expressed in dBm. A vertical axis represents power harvesting efficiency expressed as a percentage (%) of the average incident radio-frequency power that can effectively be harvested. The graph 700 comprises three curves 701-703.

A first curve 701 with circle-marked points illustrates the relationship between power harvesting efficiency and average incident radio-frequency power for the improved energy harvesting system 400 illustrated in FIG. 5 in case this system receives a non-constant envelope waveform as illustrated in FIG. 3 having a peak to average power ratio 305 of 18.24 dB. A second curve 702 with triangle-marked points illustrates the relationship between power harvesting efficiency and average incident radio-frequency power for the basic energy harvesting system 200 illustrated in FIG. 2 in case this system receives the same non-constant envelope waveform. A third curve 703 with square-marked points illustrates the relationship between power harvesting efficiency and average incident radio-frequency power for the basic energy harvesting system 200 illustrated in FIG. 2 in case this system receives a constant envelope waveform, which thus has a peak to average power ratio of 0 dB.

FIG. 7 shows that the power harvesting efficiency of the improved energy harvesting system 400 illustrated in FIG. 5 is relatively high when the average incident radio-frequency power is relatively low, less than −10 dBm. Namely, the curve 701, which represents the power harvesting efficiency of the improved energy harvesting system 400, is well above the curve 702, which represents the power harvesting efficiency of the basic energy harvesting system 200 receiving the same non-constant envelope waveform having the same peak to average power ratio. This is primarily due to the smart gating solution in the improved energy harvesting system 400 provided by the sensing circuit 407 and the controlled switch circuit 408 as described hereinbefore. This solution counters the leakage current problem in the basic energy harvesting system 200, which is detrimental to the power harvesting efficiency.

FIG. 7 further shows that the power harvesting efficiency can be improved when the average incident radio-frequency power is relatively low, less than −10 dBm, by using a non-constant envelope waveform having a relatively high peak to average power ratio instead of using a constant envelope waveform. Namely, the curves 701 and 702, which represent the power harvesting efficiency in case a non-constant envelope waveform having a relatively high peak to average power ratio is used, are both above the curve 703, which represents the power harvesting efficiency in case a constant envelope waveform of is used. This is primarily due to an impedance matching and power loss problem that occur when the incident radio-frequency power is relatively low making that a rectifier input impedance is relatively high, as explained hereinbefore.

Figure 8:
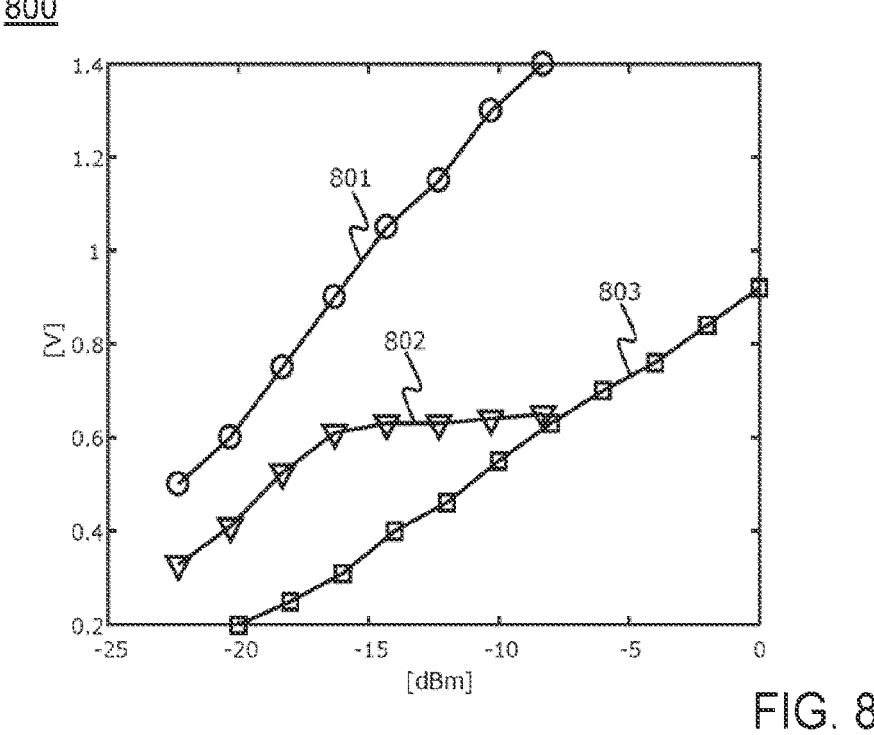
FIG. 8 is a graph in which output voltage of a power extraction circuit is plotted as a function of incident radio-frequency power for different power harvesting systems.

FIG. 8 illustrates a relationship between an output voltage of a power extraction circuit and incident radio-frequency power for different power harvesting systems. FIG. 8 provides a graph 800 having a horizontal axis that represents average incident radio-frequency power expressed in dBm. A vertical axis represents the output voltage (V) of the power extraction circuit expressed, which a power management circuit can receive as an input voltage. The output voltage is measured when the power extraction circuit is at open circuit without a load. The graph 800 comprises three curves 801-803.

A first curve 801 with circle-marked points illustrates the relationship between the output voltage of the power extraction circuit and average incident radio-frequency power for the improved energy harvesting system 400 illustrated in FIG. 5 in case this system receives a non-constant envelope waveform as illustrated in FIG. 3 having a peak to average power ratio 305 of 18.24 dB. A second curve 802 with triangle-marked points illustrates the relationship between the output voltage of the power extraction circuit and average incident radio-frequency power for the basic energy harvesting system 200 illustrated in FIG. 2 in case this system receives the same non-constant envelope waveform. A third curve 803 with square-marked points illustrates the relationship between the output voltage of the power extraction circuit and average incident radio-frequency power for the basic energy harvesting system 200 illustrated in FIG. 2 in case this system receives a constant envelope waveform, which thus has a peak to average power ratio of 0 dB.

FIG. 8 shows that the output voltage of the power extraction circuit of the improved energy harvesting system 400 illustrated in FIG. 5 is relatively high when the average incident radio-frequency power is relatively low, less than −10 dBm. Namely, the curve 901, which represents the output voltage of the power extraction circuit of the improved energy harvesting system 400, is well above the curve 902, which represents the output voltage of the power extraction circuit of the basic energy harvesting system 200 receiving the same non-constant envelope waveform having the same peak to average power ratio. This is primarily due to the smart gating solution in the improved energy harvesting system 400 provided by the sensing circuit 407 and the controlled switch circuit 408 as described hereinbefore. This solution prevents the leakage current problem in the basic energy harvesting system 200, which is detrimental to the output voltage of the power extraction circuit.

FIG. 8 further shows that the output voltage of the power extraction circuit can be improved when the average incident radio-frequency power is relatively low, less than −10 dBm, by using a non-constant envelope waveform having a relatively high peak to average power ratio instead of using a constant envelope waveform. Namely, the curves 801 and 802, which represent the output voltage of the power extraction circuit in case a non-constant envelope waveform having a relatively high peak to average power ratio is used, are both above the curve 803, which represents the output voltage of the power extraction circuit in case a constant envelope waveform of is used. This is primarily due to an impedance matching and its power loss problem that occur when the incident radio-frequency power is relatively low making that a rectifier input impedance is relatively high, as explained hereinbefore.

The higher output voltage of the power extraction circuit is, the easier start-up of the power management circuit and the higher efficiency of power management circuit is, in particular power conversation efficiency. Thus, FIG.8 also show that the improved energy harvesting system 400 illustrated in FIG. 5 outperforms the aforementioned other energy harvesting techniques.

Figure 9:
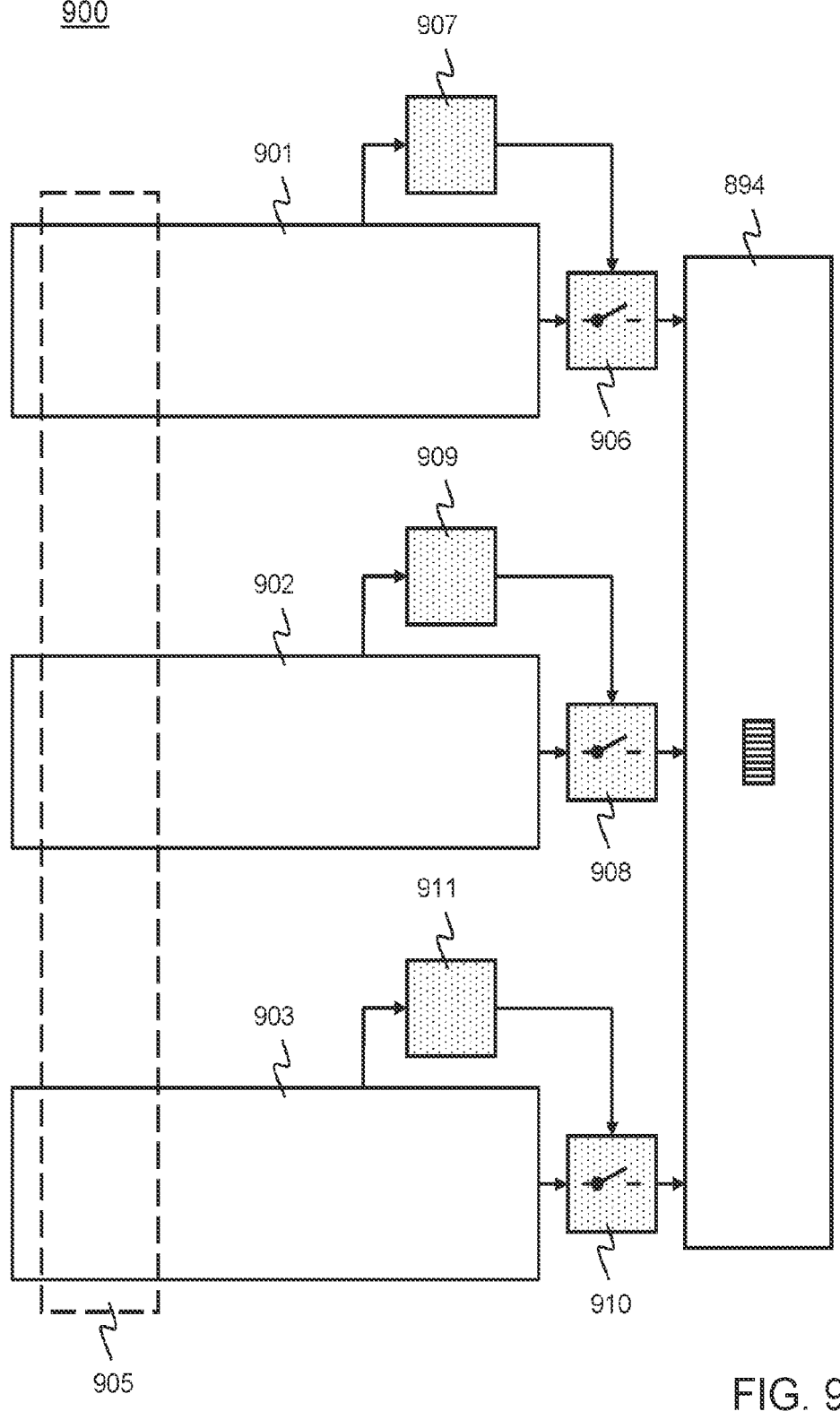
FIG. 9 is a block diagram of an extended improved implementation of the energy harvesting system.

FIG. 9 schematically illustrates an extended improved implementation 800 of the energy harvesting system 103. FIG. 9 provides a block diagram of this extended improved implementation 900, which will be referred to hereinafter as extended improved energy harvesting system 900 for the sake of convenience. The extended improved energy harvesting system 900 comprises multiple power extraction circuits 901-903 that are coupled to an electrical power storage device 904. In FIG. 9, three power extraction circuits 901, 902, 903 are illustrated for the sake of simplicity and convenience. The three power extraction circuits 901, 902, 903 may have a similar topology but different parameters for differently extracting electrical power from an environmental power source. For example, the three power extraction circuits 901, 902, 903 may be optimized for different frequencies that the environmental power source may have, or for different power levels that the environmental power source may provide, or for different combinations of these. The three power extraction circuits 901, 902, 903 may share a common transducer 905, such as, for example, an antenna, that picks up environmental power and converts this into an electrical input signal for a rectifier.

A first power extraction circuit 901 is coupled to the electrical power storage device 904 through a first controlled switch circuit 906. A first sensing circuit 907 provides an indication of a level of power that the first power extraction circuit 901 can extract from the environmental power source. Similarly, a second power extraction circuit 902 is coupled to the electrical power storage device 904 through a second controlled switch circuit 908. A second sensing circuit 909 provides an indication of a level of power that the second power extraction circuit 902 can extract from the environmental power source. A third power extraction circuit 903 is coupled to the electrical power storage device 904 through a third controlled switch circuit 910. A third sensing circuit 911 provides an indication of a level of power that the third power extraction circuit 903 can extract from the environmental power source.

The aforementioned sensing circuits and controlled switch circuits may operate in manner similar to that described hereinbefore with regard to the sensing circuit and controlled switch circuit in the improved energy harvesting system 400 illustrated in FIG. 4. The extended improved energy harvesting system 900 thus has a smart, adaptive behavior, which allows this system to efficiently harvest energy in different conditions.

The embodiments described hereinbefore with reference to the drawings are presented by way of illustration. The invention may be implemented in numerous different ways. In order to illustrate this, some alternatives are briefly indicated.

The invention may be applied in numerous types of products or methods related to power harvesting. In the embodiments described hereinbefore, the environmental power source is an emitted radio-frequency signal. In other embodiments, the environmental power source may be in the form of, for example, light, heat, wind, vibration and other types of mechanical energy. Whatever the form of the environmental power source, the invention prevents leakage and thus loss of harvested energy in conditions where the level of power that can be extracted from the environmental power source fluctuates. Power level fluctuations may be relatively rapid, such as, for example, having a frequency higher than 1 kHz, or may be slower. For example, let it be assumed that the environmental power source is in the form of a mechanical vibration that fluctuates in intensity. In such an alternative embodiment, an energy harvesting system in accordance with the invention may comprise a transducer for converting the mechanical vibration into an electrical alternating current signal. For the rest, numerous details of implementation and operation of the embodiments described hereinbefore may be transposed to such an alternative embodiment.

There are numerous different ways of implementing a power extraction circuit in an energy harvesting system in accordance with the invention. For example, referring to the embodiment illustrated in FIG. 4, the impedance matching circuit 402 may be tunable or may be another impedance matching network structure, whereby the power extraction circuit may comprise a tuning control circuit for tuning the impedance matching circuit 402 with the aim of maximizing power harvesting efficiency. As another example, a power extraction circuit may comprise multiple antennas, or multiple impedance matching circuits, or both, whereby the power extraction circuit may comprise a selection control circuit for selecting an antenna or an impedance matching circuit, or both, with the aim of maximizing power harvesting efficiency.

There are numerous different ways of implementing a controlled switch circuit in an energy harvesting system in accordance with the invention. In the embodiment illustrated in FIG. 5, the voltage that is present on the electrical power storage device 406 is used as a comparator threshold voltage. In other embodiments, a different threshold voltage may be used that reflects a borderline between the power extraction circuit being susceptible of charging or discharging the electrical power storage device. As another example, the controlled switch circuit may comprise a comparator that has a hysteresis, or a general continuous-time static comparator, or an auto-zero comparator.

In general, there are numerous different ways of implementing the invention, whereby different implementations may have different topologies. In any given topology, a single entity may carry out several functions, or several entities may jointly carry out a single function. In this respect, the drawings are very diagrammatic. For example, although FIG. 1 illustrates a wirelessly powered device 102 having two antennas, the wirelessly powered device 102 may comprise a single antenna with a radio-frequency switch for switching between reception and transmission by means of this single antenna.

The remarks made hereinbefore demonstrate that the embodiments described with reference to the drawings illustrate the invention, rather than limit the invention. The invention can be implemented in numerous alternative ways that are within the scope of the appended claims. All changes that come within the meaning and range of equivalency of the claims are to be embraced within their scope. Any reference sign in a claim should not be construed as limiting the claim. The verb "comprise" in a claim does not exclude the presence of other elements or other steps than those listed in the claim. The same applies to similar verbs such as "include" and "contain". The mention of an element in singular in a claim pertaining to a product, does not exclude that the product may comprise a plurality of such elements. Likewise, the mention of a step in singular in a claim pertaining to a method does not exclude that the method may comprise a plurality of such steps. The mere fact that respective dependent claims define respective additional features, does not exclude combinations of additional features other than those reflected in the claims.

The invention claimed is:

1. An energy harvesting system, comprising:
a power extraction circuit adapted to extract electrical power from an environmental power source susceptible of providing a level of power that fluctuates, the power extraction circuit comprising a rectifier circuit adapted to convert electrical alternating current power into electrical direct current power,
an electrical power storage device adapted to store the electrical direct current power;
a sensing circuit coupled to receive from the power extraction circuit a signal that is present at an input of the rectifier circuit, the sensing circuit being configured to provide an indication of a level of power instantaneously extractable from the environmental power source by the power extraction circuit; and
a controlled switch circuit configured to electrically decouple the power extraction circuit from the electrical power storage device within a time-interval several orders of magnitude shorter than one second when the indication indicates that the level of power instantaneously extractable from the environmental power source by the power extraction circuit is insufficient to charge the electrical power storage device.

2. The energy harvesting system according to claim 1, wherein the rectifier circuit is a cross-coupled rectifier.

3. The energy harvesting system according to claim 1, wherein the sensing circuit comprises an auxiliary rectifier circuit, wherein the auxiliary rectifier circuit is a scaled-down replica of the rectifier circuit.

4. The energy harvesting system according to 3, wherein the power extraction circuit comprises a capacitor at an output node of the rectifier circuit, and wherein the sensing circuit comprises a scaled-down replica of the capacitor at the output node of the scaled-down replica of the rectifier circuit.

5. The energy harvesting system according to claim 4, wherein a same scaling factor applies to the scaled-down replica of the rectifier circuit and the scaled-down replica of the capacitor in the sensing circuit with respect to the rectifier circuit and the capacitor, respectively, in the power extraction circuit.

6. The energy harvesting system according to claim 2, wherein the rectifier circuit comprises semiconductor devices that function as rectifying elements, the scaled-down replica of the rectifier circuit comprising scaled-down replicas of the semiconductor devices that function as rectifying elements.

7. The energy harvesting system according to claim 3, wherein the controlled switch circuit is adapted to electrically decouple the electrical power storage device from the power extraction circuit when a voltage at the output node of the scaled-down replica of the rectifier circuit is below a threshold level.

8. The energy harvesting system according to claim 7, wherein the threshold level corresponds with a voltage on the electrical power storage device.

9. The energy harvesting system according to claim 7, wherein the controlled switch circuit comprises a comparator with delayed hysteresis adapted to compare the voltage at the output node of the scaled-down replica with the threshold level.

10. The energy harvesting system according to claim 1, further comprising a power management circuit adapted to generate a power supply voltage from the electrical power stored in the electrical power storage device.

11. The energy harvesting system according to claim 1, further comprising a plurality of power extraction circuits of which the power extraction circuit is part, the power extraction circuits having a similar topology but different parameters for differently extracting electrical power from the environmental power source.

12. The energy harvesting system according to claim 1, wherein the power extraction circuit comprises an antenna adapted to extract electrical power from environmental radio frequency power.

13. The energy harvesting system according to claim 1, the power extraction circuit comprises an impedance matching network coupled between the antenna and the rectifier.

14. A wireless system, comprising: a power emitting device adapted to wirelessly emit a power signal having a high peak to average power ratio; and a wirelessly powered device comprising an energy harvesting system according to claim 1.

* * * * *